Nov. 30, 1926.
A. C. STEWART
REFRIGERATING APPARATUS
Filed Nov. 5, 1923
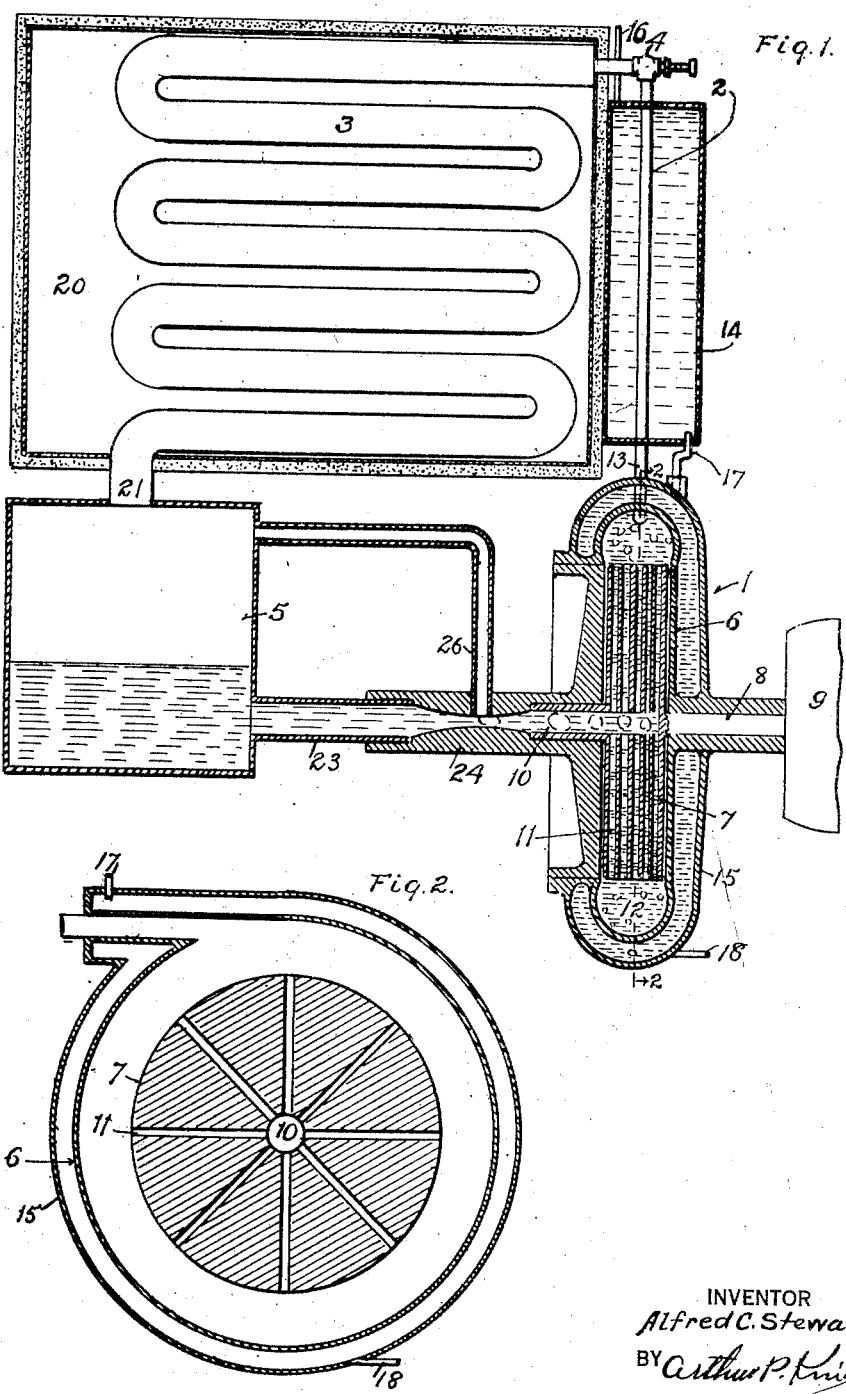
INVENTOR
Alfred C. Stewart
BY Arthur P. Knight
ATTORNEY Patented Nov. 30, 1926.

1,608,681

UNITED STATES PATENT OFFICE.

ALFRED C. STEWART, OF PASADENA, CALIFORNIA.

REFRIGERATING APPARATUS.

Application filed November 5, 1923. Serial No. 672,837.

This invention relates to a refrigerating apparatus adapted for the production of a refrigerating effect by expansion of a volatile liquid and the main object of the invention is to provide an efficient, compact, and economical apparatus for this purpose.

A further object of the invention is to provide effective means for refrigeration by means of a medium including both a volatile liquid and a carrier gas, including two media of different condensability, for example, a relatively volatile and a relatively non-volatile liquid, so as to obtain the most effective conditions for compression and evaporation of the volatile constituents. In this connection my invention provides for compression of the volatile constituent by utilization of a liquid as a compressing medium.

A further object of the invention is to provide in a refrigerating cycle, means for compression of the volatile refrigerating medium by a rotary compressor adapted to operate at high speed and without gears or reciprocating parts so as to provide for efficient and substantially noiseless operation.

The accompanying drawings illustrate an embodiment of my invention and referring thereto:

Fig. 1 is a vertical section of the refrigerating apparatus.

Fig. 2 is a section on line 2—2 of Fig. 1.

The apparatus shown in the drawing comprises a compressor indicated at 1, cooling means indicated at 2, for cooling the compressed medium, an expansion or refrigerating chamber 3 into which the refrigerating medium is released from the cooling means through an expansion valve 4, a separator chamber 5 in which the constituents of different condensability in the refrigerating medium are separated and means for conducting both of such constituents to the intake of the compressor 1.

The compressor is preferably a rotary compressor comprising a casing 6 in which is mounted to rotate a rotary member 7 carried by a shaft 8 which is operated at high velocity by any suitable means, for example, by direct connection to an electric motor indicated at 9. Said rotary member 7 is provided with a central passage 10 and with a plurality of passages 11 extending outwardly, for example, radially from the central passage 10 and opening at their outer ends at the periphery of the rotary member 7 into the space 12 within the casing 6 and around the rotary member 7. The central passage 10, aforesaid, communicates with suitable aspirating means for supplying the refrigerating medium to the said passage which constitutes the intake of the pump or compressor as hereinafter described. An outlet pipe 13 leads from the space 12 aforesaid to the expansion valve 4, the outlet connections as shown including the cooling means 2, surrounded by jacket 14. It is also preferred to provide for cooling of the compressor, for example, by means of a jacket 15, enclosing the casing 6, suitable connections indicated at 16, 17, and 18, being provided for maintaining a flow or circulation of cooling liquid, such as water through the cooling means 14 and 15.

The expansion chamber 3 is shown as a coil connected to the expansion valve 4 and enclosed in the chamber or enclosure 20 which is to be cooled, the said expansion chamber being provided with an outlet 21 opening into the separator chamber 5. From the lower part of the separator chamber an outlet 23 for liquid leads to the aspirating means 24 which may consist of a Venturi tube into the contracted portion, or neck, of which opens a tube or conduit 26 leading from the upper part of the separator 5 so as to deliver the less condensable constituent of the refrigerating medium to the Venturi tube at the point of minimum pressure so as to effect entrainment of the said less condensable constituents along with the liquid delivered through the outlet pipe 23 of the separator.

The refrigerating operation may be carried out in the above described apparatus in any one of several ways utilizing in each case the expansion or evaporation of a volatile liquid in producing the required absorption of heat. For example, I may use a mixture of two liquids of different volatility such for example as ethyl chloride, carbon tetra-chloride, rhigolene, or other liquid having a relatively low boiling point or high vapor tension and another liquid of relatively low volatility such as water or brine, the said two liquids being immiscible or substantially insoluble in one another so that they will tend to separate when in the liquid phase. Assuming that such a mixture of liquids is introduced into the separator 5 and the pump 1 is set into operation, one or both of the liquids will be withdrawn from said separator by the action of the pump and forced through the outlet 13. If necessary storage means may be connected to said outlet to receive the compressed medium, for example, the cooling means 2 may be of sufficient capacity to act as a storage means. The expansion valve is sufficiently closed to restrain the outflow of the compressed medium into the refrigerating coils or chamber 3, so that a condition of rarefaction (or at least at a pressure below that in the cooling means 2) may be produced in said coils or chamber 3 and in the upper part of chamber 5. Assuming that the chamber 3 and the upper part of chamber 5 are originally occupied by vapor of the ethyl chloride or other volatile liquid together with more or less air, such vapor with any gas, such as air mixed therewith will be aspirated through the pipe 26 and aspirator 24 into the pump and will be entrained by the streams of liquid passing outwardly in the passages 11 of the rotary member 7 of the pump, and will be ejected into the compression chamber 12. the liquid passing through said passages 1 forming fluid pistons which exert sufficient pressure by centrifugal action to produce the required compression of the vapor or gas so as to force such vapor or gas through the outlet 13 to the expansion valve 4 and to the cooling and storage means 2. Such compressed vapor is cooled, for example, by the water jacket means 15 and 14, so as to absorb the heat developed by compression of the rotary pump and cause the vapor to condense to liquid condition. The resulting condensed liquid gradually escapes through the expansion valve 4, which may be a needle valve of ordinary construction, and as the liquid so escapes into the chamber 3 the volatile constituent thereof evaporates, absorbing heat represented by the latent heat of evaporation. The non-volatile constituent also passes into the chamber 3, which is so constructed as to permit such non-volatile constituent to flow as a liquid into the separator 5, the construction being such that the liquid may flow by gravity through the refrigerating coil or chamber and into the separator chamber, which is located below said refrigerating chamber. The vapor produced from the volatile constituent occupies the upper part of separator chamber 5 which is in communication with the aspirator pipe 26. In the case of liquids whose boiling temperature is above the temperature required to be established in the refrigerator chamber it is desirable to maintain a condition of rarefaction in said chambers 3 and 5 by the operation of said rotary pump so that the pressure in said chambers is sufficiently low to ensure that said volatile medium will be converted substantially wholly to the vapor phase in the chambers 3 and 5. If, however, the pressure is allowed to rise sufficiently to cause incomplete vaporization of the volatile constituent the non-volatile constituent and the unvaporized portion of the volatile constituent will separate in the separator chamber 5 by reason of their difference in specific gravity and of their immiscibility and such unvaporized portion of the relatively volatile constituent as may so accumulate in the separator chamber 5 may remain or may be drawn through the pipe 23 or the pipe 26 as the case may be.

As an alternative method of operation a refrigerating medium may be used comprising two constituents which are soluble in one another for example a mixture of ammonia and water, and in that case the separator 5 will contain a body of water or brine with more or less dissolved ammonia and a body of ammonia vapor or gas in the space above said body of liquid, the liquid being drawn through the inlet pipe 23 and the ammonia gas being drawn through the inlet pipe 26 by aspirating action and compressed by the rotary pump 1 so that by reason of the pressure it is caused to be dissolved in the body of liquid constituting a concentrated solution of ammonia in water or brine. The heat evolved during such compression and absorption is removed by the cooling means 15 and 14, and the liquid is delivered through valve 4 into the chamber 3 which is for example at substantially atmospheric pressure so that the ammonia will largely evaporate or resume its condition as vapor or gas, producing the refrigerating effect by absorption of heat. The cooling effect in this case is due to the absorption of heat which occurs when ammonia passes out of solution into the vapor state.

Another method of operation may utilize a relatively volatile liquid, for example alcohol, ethyl chloride, or any of the liquids above mentioned, or even water (which is sufficiently volatile under suitable conditions of rarefaction and of air velocity) and a substantially non-condensable gaseous medium such as air, the liquid being any sufficient quantity to accumulate to some extent in the separator 5 and in the pump so as to form the working medium operating by centrifugal action to compress the air and the vaporized portion of the refrigerating medium, the compression being sufficient to cause condensation of the said medium in the ensuing cooling operation, and the total medium being released through valve 4 into the chamber 3 at lower pressure so that the refrigerating action is accomplished by evaporation of part of such medium. It will be understood that in this case the pressure in the chamber 3 and the separator chamber 5 will be the sum of the partial pressures of the evaporated medium and the air or other non-condensable gas which may be present, and by suitably proportioning the amount of air in the system to the amount of liquid present, any desired proportion of the liquid may be evaporated, whether such liquid be a readily volatile liquid or a less volatile liquid, such as water.

The above described apparatus is also applicable for use with a refrigerating medium consisting of a single liquid, for example, ethyl chloride, or any of the volatile liquids ordinarily used in an apparatus of this character. By supplying a suitable amount of such liquid to the system the operation of the pump will result in continual evaporation and compression of a portion only of the liquid, the remainder of the medium remaining in liquid phase throughout the operation and serving as the liquid element for performing the aspirating and compressing operations above described.

An important feature of the present invention is that all reciprocating parts and gears are avoided, the rotary pump being especially adapted for direct connection with a high speed electric motor and being substantially noiseless in operation so that the system as a whole is especially adapted for domestic or similar use where the absence of noise and of parts subject to rapid wear are especially desirable. A more important advantage of the invention, however, is that the compressing operation is performed under conditions which are substantially iso-thermal by reason of the intimate contact of the vapor with the compressing liquid and with the walls of the passages in which the compression is effected. By reason of such substantially iso-thermal compression, maximum efficiency of the compressing operation is obtained with a corresponding efficiency of the refrigerating operations as a whole.

What I claim is:

1. A refrigerating apparatus comprising a rotary compressor, a cooler connected to the discharge side of said compressor, a refrigerating chamber, an expansion valve between said cooler and said refrigerating chamber, a separator chamber connected to said refrigerating chamber to receive material passing therethrough, a pipe leading from the lower part of said separator chamber to the intake of said compressor, aspirating means in said pipe, and another pipe leading from the upper part of the separator chamber to said aspirating means.

2. A refrigerating apparatus comprising a separator chamber adapted to contain a refrigerating medium comprising liquid and vapor constituents, a rotary pump, means for conducting said liquid constituent from the lower part of said separator chamber to said pump, aspirating means in said liquid conducting means, means for conducting said vapor constituent from the upper part of the separator chamber to the aspirating means, in such manner that said vapor constituent is entrained with the liquid constituent, said pump being provided with a rotary member having outwardly extending passages for receiving refrigerating medium and compressing the vapor constituent thereof by centrifugal action on the liquid constituent, means for receiving the refrigerating medium after compression and for cooling the same so as to condense the vapor constituent thereof, a refrigerating chamber, an expansion valve controlling the escape of such compressed and cooled refrigerating medium into said refrigerating chamber, said refrigerating chamber being connected to the separator chamber so as to return both constituents of the refrigerating medium thereto.

3. A construction as set forth in claim 2, in which the refrigerating chamber is located above the separator chamber and is so constructed as to permit the liquid constituent of the refrigerating medium to flow by gravity through said refrigerating chamber and into said separator chamber.

In testimony whereof I have hereunto subscribed my name this 24th day of October 1923.

ALFRED C. STEWART.